United States Patent
Eaton

(10) Patent No.: US 7,669,870 B2
(45) Date of Patent: Mar. 2, 2010

(54) RETROFIT ADJUSTABLE ECCENTRIC FRONT MOTORCYCLE AXLE

(75) Inventor: Alden R. Eaton, Gig Harbor, WA (US)

(73) Assignee: Rekluse Motor Sports, Inc, Boise, ID (US)

( * ) Notice: Subject to any disclaimer, the term of this patent is extended or adjusted under 35 U.S.C. 154(b) by 545 days.

(21) Appl. No.: 11/247,088

(22) Filed: Oct. 12, 2005

(65) Prior Publication Data

US 2008/0067861 A1  Mar. 20, 2008

(51) Int. Cl.
*B62K 21/06* (2006.01)
*B60B 27/02* (2006.01)

(52) U.S. Cl. .................. 280/276; 280/279; 280/275; 301/110.5; 301/124.2

(58) Field of Classification Search ............. 280/279, 280/276, 275; 301/110.5, 124.2
See application file for complete search history.

(56) References Cited

U.S. PATENT DOCUMENTS

| | | | | |
|---|---|---|---|---|
| 3,521,904 A | * | 7/1970 | Sheffer | 280/270 |
| 3,770,295 A | * | 11/1973 | Sword | 280/229 |
| 3,971,571 A | * | 7/1976 | Yoshioka | 280/276 |
| 4,082,307 A | * | 4/1978 | Tait | 280/277 |
| 6,474,432 B1 | * | 11/2002 | Schmidt et al. | 180/209 |
| 6,485,043 B2 | * | 11/2002 | Ito et al. | 280/276 |
| 6,708,999 B1 | * | 3/2004 | Baltes et al. | 280/276 |
| 7,273,259 B2 | * | 9/2007 | Fukui | 301/110.5 |
| 7,347,438 B2 | * | 3/2008 | Raddin | 280/279 |

* cited by examiner

*Primary Examiner*—Lesley D Morris
*Assistant Examiner*—Marlon A Arce
(74) *Attorney, Agent, or Firm*—Kunzler & McKenzie

(57) ABSTRACT

An adjustable axle assembly for the front fork of a motorcycle. In the preferred embodiment, the axle is received within an eccentric axle carrier which in turn is received within mounting holes in the front fork. The mounting holes utilize a pinch bolts as a clamping method to secure the eccentric axle carrier within the fork. In the preferred embodiment, loosening the pinch bolts allows the eccentric axle carrier to be rotated effectively moving the position of the wheel relative to the fork. Moving the wheel forward and backwards changes the trail characteristic of the motorcycle's geometry.

18 Claims, 2 Drawing Sheets

RETROFIT ADJUSTABLE ECCENTRIC FRONT MOTORCYCLE AXLE

BACKGROUND OF THE INVENTION

1. Field of the Invention

The present invention generally relates to motorcycles having two front fork tubes and more particularly, to front wheel position adjustment mechanisms for such motorcycles.

2. Description of Related Art

Motorcycles conventionally have a pair of front forks that support opposite ends of a front wheel axle. It is desirable to be able to adjust the position of the front wheel of the motorcycle with respect to the front forks, specifically the horizontal position of the front end (known as the front wheel trail), as this adjustment changes the steering characteristics of the motorcycle. With conventional motorcycles, this adjustment is not possible without changing the fork tubes or the fork tube carriers (also known as the triple clamps); an expensive and time consuming endeavor Therefore, there exists a need in the art for a method and device for adjusting the front wheel trail of a motorcycle quickly and easily without the need to change parts.

SUMMARY OF THE INVENTION

The present invention provides an adjustable front wheel axle.

In a preferred embodiment of the present invention, an adjustable front axle assembly for a motorcycle includes a pair of fork tubes comprising an axle carrier housing, an axle carrier, a pair of wheel bearing carriers and a wheel comprising a pair of wheel bearings. The axle carrier housings are provided by the distal end of the fork tubes. Each axle carrier is received within the axle carrier housing and defines an eccentrically-disposed axle opening through which an axle extends. Each wheel bearing carrier is received by the wheel bearings on each side of the wheel. The axle extends through the axle carriers and wheel bearing carriers. The axle and axle carriers are coupled rotationally through a securing mechanism.

Rotation of the axle causes the wheel to move horizontally and vertically relative to the axle carrier housing. Accordingly, the position of the front wheel, both horizontally and vertically, relative to the rest of the motorcycle, may easily be adjusted. For most motorcycles, changing the horizontal position of the front wheel relative to the rest of the motorcycle has the most dramatic effect on how the motorcycle steers. Changing the vertical position of the front wheel relative to the rest of the motorcycle also has a small effect of the rake dimension of the motorcycle's steering geometry.

DETAILED DESCRIPTION OF THE PREFERRED EMBODIMENTS

The following is a detailed description of the preferred embodiment as it would appear on a modern motorcycle.

DESCRIPTION OF THE ELEMENTS

Figure 1:
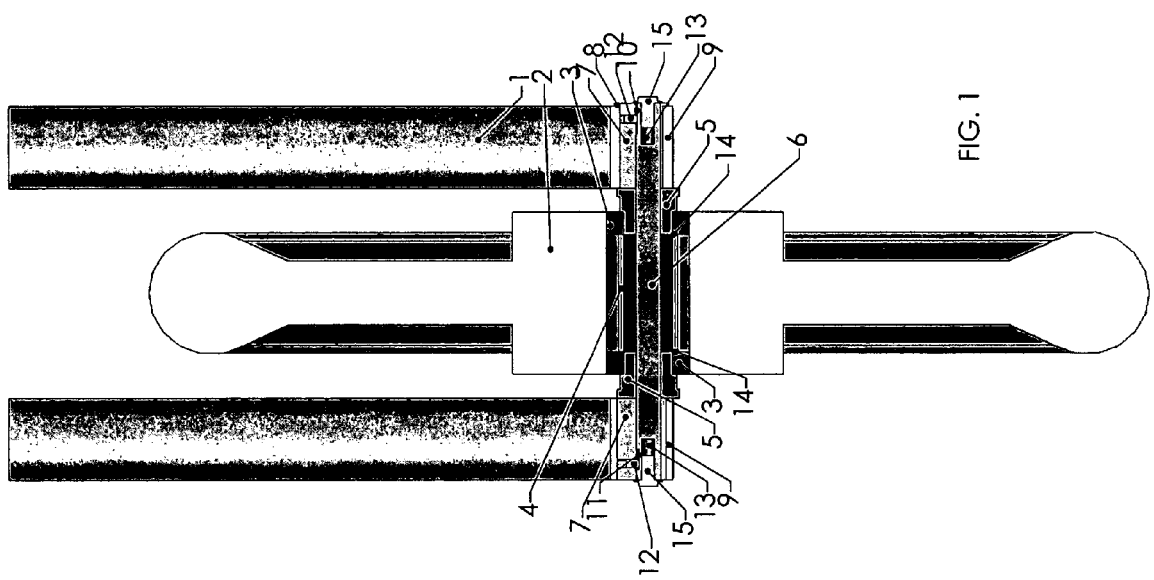
FIG. 1 is a cross-sectional view of an adjustable front axle assembly

1) Front fork tubes
2) Front wheel
3) Front wheel bearings
4) Front wheel bearing locating tube
5) Wheel bearing carriers
6) Axle
7) Axle carrier
8) Axle carrier flange
9) Axle carrier housing
10) Axle flat
11) Axle flat to end
12) Axle carrier locating pin
13) Axle tapped hole
14) Wheel bearing inner race
15) Axle bolt
16) Axle carrier housing pinch bolts
17) Axle carrier housing slit FIG. 1 illustrates the preferred embodiment. Referring to FIG. 1, the front wheel 2 is positioned between the front fork tubes 1. The wheel bearing carriers 5 locate into the wheel bearings 3. The axle carriers 7 locate into the axle carrier housings 9. The Axle 6 locates into and passes through the axle carriers 7 and wheel bearing carriers 5. Each of the axle carrier locating pins 10 mate flush to the surface of the axle flat 10 and axle flat to end 11 locating the axle carriers and axle rotationally.

The assembly is secured first by tightening the axle carrier housing pinch bolts 16.which secures one side of the axle carriers against horizontal and rotational movement. Second, on the same side, the axle bolt 15 is also tightened securing the axel 6 horizontally flush to the end of the axle carrier 7. Third, on the opposite side, the axle bolt 15 is tightened, applying a compression load between the axle carriers 7, wheel bearing carriers 5, wheel bearing inner race 14, the front wheel bearing locating tube 4, and the axle carrier flange 8. Finally, the opposite side axle carrier housing pinch bolts 16 are tightened, securing the entire structure.

The assembly is adjusted by loosening the axle carrier housing pinch bolts 16 on both axle carrier housings. To change the position of the front wheel 2 relative to the rest of the motorcycle, one of the axle bolts 15 is turned, which in turn rotates the axle 6 which in turn rotates both axle carriers 7.

Figure 2:
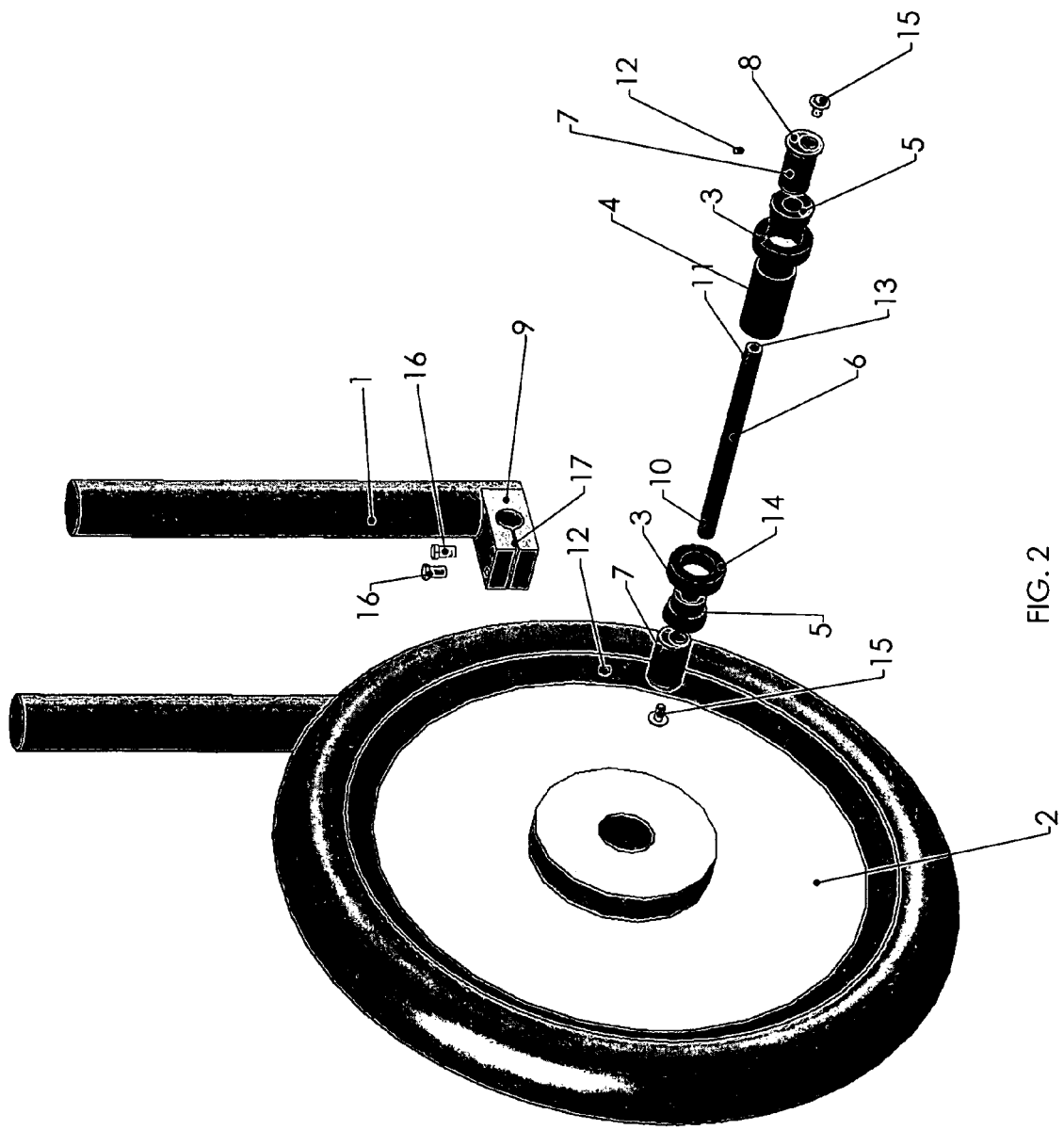
FIG. 2 is an exploded perspective view of an adjustable front axle assembly

FIG. 2 provides an exploded view of the preferred embodiment.

The description above is provided to illustrate generally the invention in terms of the preferred embodiment as is provided for the purposes of illustration, not limitation. One skilled in the art will appreciate that the invention anticipates other embodiments beyond the embodiment described above. Accordingly, the invention is limited only by the claims as set forth below.

What is claimed is:

1. An apparatus for adjustment of a motorcycle axle, the apparatus comprising:
   a plurality of axle ends, each axle end conforming to an opening in a wheel bearing carrier in order to pass through the wheel bearing carrier, engage an eccentric axle carrier, and couple a wheel with a fork tubes of a motorcycle; wherein, the wheel bearing carrier is shaped to receive a wheel bearing, and
   wherein the wheel bearing carrier is concentric with the axle;
   wherein the eccentric axle carriers is disposed between the fork tubes and the wheel bearing carrier, and the eccentric axle carrier is shaped to receive the wheel bearing carrier and the axle end;
   wherein the eccentric axle carrier is received and secured by an axle carrier housing that is concentric with the eccentric axle carrier and formed in the fork tubes;

wherein rotation of the eccentric axle carrier within the axle carrier housing causes the axle to move horizontally and vertically with relation to an axis formed by the axle carrier housing; and wherein the eccentric axle carrier maintains the axle in a position parallel to and offset from the axis.

2. The apparatus of claim 1, wherein the plurality of eccentric axle carriers comprise a left eccentric axle carrier and a right eccentric axle carrier.

3. The apparatus of claim 2, wherein the left eccentric axle carrier comprises an opening that corresponds with an opening in a left end of the axle, the opening configured to receive a locating pin.

4. The apparatus of claim 3, wherein the locating pin is configured to rotationally couple the left eccentric axle carrier with the axle.

5. The apparatus of claim 4, wherein the right eccentric axle carrier comprises an opening configured to receive a locating screw, the locating screw configured to pass through the opening in the right eccentric axle carrier and engage a flat surface in the axle.

6. The apparatus of claim 5, wherein the locating screw is further configured to rotationally couple the right eccentric axle carrier with the axle.

7. The apparatus of claim 6, wherein rotation of the right eccentric axle carrier is synchronized with the left eccentric axle carrier.

8. An apparatus for adjustment of a motorcycle axle, the apparatus comprising:

a plurality of axle ends, each axle end conforming to an opening in a wheel bearing carrier in order to pass through the wheel bearing carrier, engage an eccentric axle carrier, and couple a wheel with a fork tube of a motorcycle;

wherein, the wheel bearing carrier is shaped to receive a wheel bearing, and wherein the wheel bearing carrier is concentric with the axle;

wherein the eccentric axle carrier is disposed between the fork tube and the wheel bearing carrier, and the eccentric axle carrier is shaped to receive the wheel bearing carrier and the axle end;

wherein the eccentric axle carrier is received and secured by an axle carrier housing that is concentric with the eccentric axle carrier and formed in the fork tube;

wherein rotation of the eccentric axle carrier within the axle carrier housing causes the axle to move horizontally and vertically with relation to an axis formed by the axle carrier housing; and wherein the eccentric axle carrier maintains the axle in a position parallel to and in-line with the axis.

9. The apparatus of claim 8, wherein the plurality of eccentric axle carriers comprise a left eccentric axle carrier and a right eccentric axle carrier.

10. The apparatus of claim 9, wherein the left eccentric axle carrier comprises an opening that corresponds with an opening in a left end of the axle, the opening configured to receive a locating pin.

11. The apparatus of claim 10, wherein the locating pin is configured to rotationally couple the left eccentric axle carrier with the axle.

12. The apparatus of claim 11, wherein the right eccentric axle carrier comprises an opening configured to receive a locating screw, the locating screw configured to pass through the opening in the right eccentric axle carrier and engage a flat surface in the axle.

13. The apparatus of claim 12, wherein the locating screw is further configured to rotationally couple the right eccentric axle carrier with the axle.

14. The apparatus of claim 13, wherein rotation of the right eccentric axle carrier is synchronized with the left eccentric axle carrier.

15. A system for adjustment of a motorcycle axle, the apparatus comprising:

an axle for coupling a wheel with front fork tubes of a motorcycle;

a plurality of wheel bearing carriers, each wheel bearing carrier configured to receive one end of the axle, and wherein the wheel bearing carrier is concentric with the axle;

a plurality of eccentric axle carriers disposed between the front fork tubes and the wheel bearing carrier, each eccentric axle carrier configured to receive the wheel bearing carrier;

wherein the plurality of eccentric axle carriers comprise a left eccentric axle carrier and a right eccentric axle carrier, the left eccentric axle carrier comprising an opening that corresponds with an opening in a left end of the axle, the opening configured to receive a locating pin;

wherein the right eccentric axle carrier comprises an opening configured to receive a locating screw, the locating screw configured to pass through the opening in the right eccentric axle carrier and engage a flat surface in the axle, wherein the eccentric axle carrier is received and secured by an axle carrier housing that is concentric with the eccentric axle carrier and formed in the front fork tubes; and wherein rotation of the eccentric axle carrier within the axle carrier housing causes the axle to move horizontally and vertically with relation to an axis formed by the axle carrier housing.

16. The apparatus of claim 15, wherein the locating pin is configured to rotationally couple the left eccentric axle carrier with the axle.

17. The apparatus of claim 15, wherein the locating screw is further configured to rotationally couple the right eccentric axle carrier with the axle.

18. The apparatus of claim 15, wherein rotation of the right eccentric axle carrier is synchronized with the left eccentric axle carrier.

* * * * *